April 12, 1927.

A. BLEAM 1,624,034

SEED CLEANING MACHINE

Filed June 25, 1925

Inventor
A. Bleam
By D. Swift
Attorney

April 12, 1927.　　　　A. BLEAM　　　　1,624,034
SEED CLEANING MACHINE
Filed June 25, 1925　　　3 Sheets-Sheet 3

Inventor
A. Bleam
By D. Swift
Attorney

Patented Apr. 12, 1927.

1,624,034

UNITED STATES PATENT OFFICE.

ALBERT BLEAM, OF CLARKSVILLE, MICHIGAN.

SEED-CLEANING MACHINE.

Application filed June 25, 1925. Serial No. 39,538.

The invention relates to seed cleaning machines, and has for its object to provide a machine particularly adapted for separating clover seed from buckhorn and provided with means whereby a maximum amount of seed may be cleaned during the same operation and from a single source of power.

A further object is to provide a clover seed cleaning machine comprising a plurality of pairs of superimposed V-shaped arranged inclined conveyors, onto which seed is discharged from a hopper, and which conveyors rotate upwardly and outwardly thereby agitating and bouncing the seed as it is slowly moved in the direction of the incline of the conveyors. The conveyors are formed from canvas, to which the buckhorn sticks, and from which buckhorn is scraped from the conveyors at their under sides.

A further object is to provide beneath each pair of conveyors longitudinally disposed deflecting shields V-shaped in cross section, and which shields deflect the dislodged buckhorn into troughs suspended at opposite sides of the shields.

A further object is to mount the ends of the rollers, around which the canvas conveyor belts extend in adjustable bearings, by means of which the conveyors may be adjusted or the inclination thereof slightly varied.

A further object is to provide a pipe at one end of the machine provided with a plurality of branches which terminate below the discharge ends of the conveyors whereby the cleaned seed will be discharged into the single pipe and conveyed to any suitable point of discharge.

A further object is to provide the outer rollers of the conveyors with sprockets over which an endless sprocket chain passes and a single driving means for said sprocket chain, whereby all of the conveyors will be simultaneously operated.

A further object is to provide a feed hopper from which feed hopper seed to be cleaned is fed and discharged onto the conveyors through pipes.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
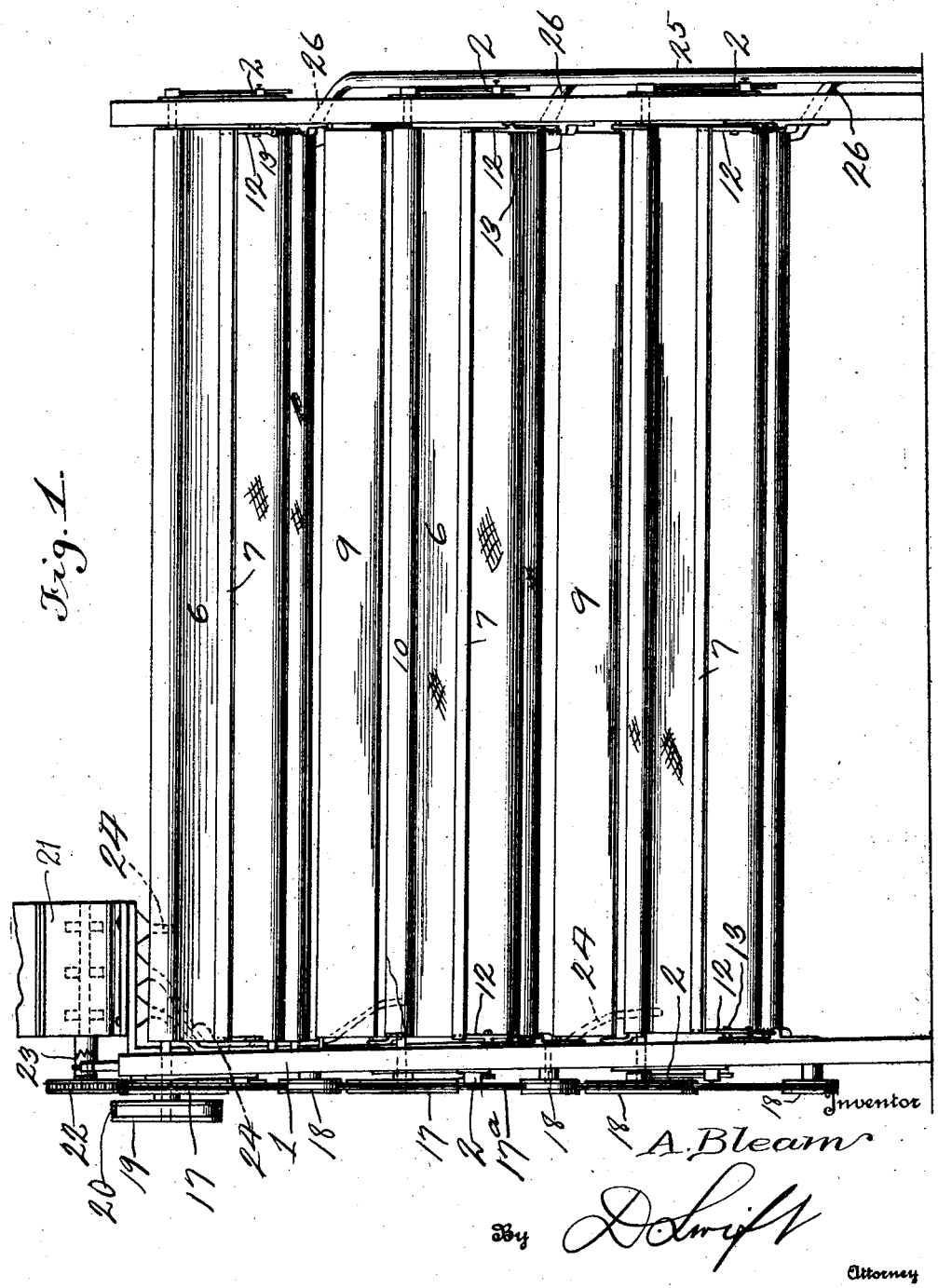
Figure 1 is a side elevation of the machine.
Figure 2:
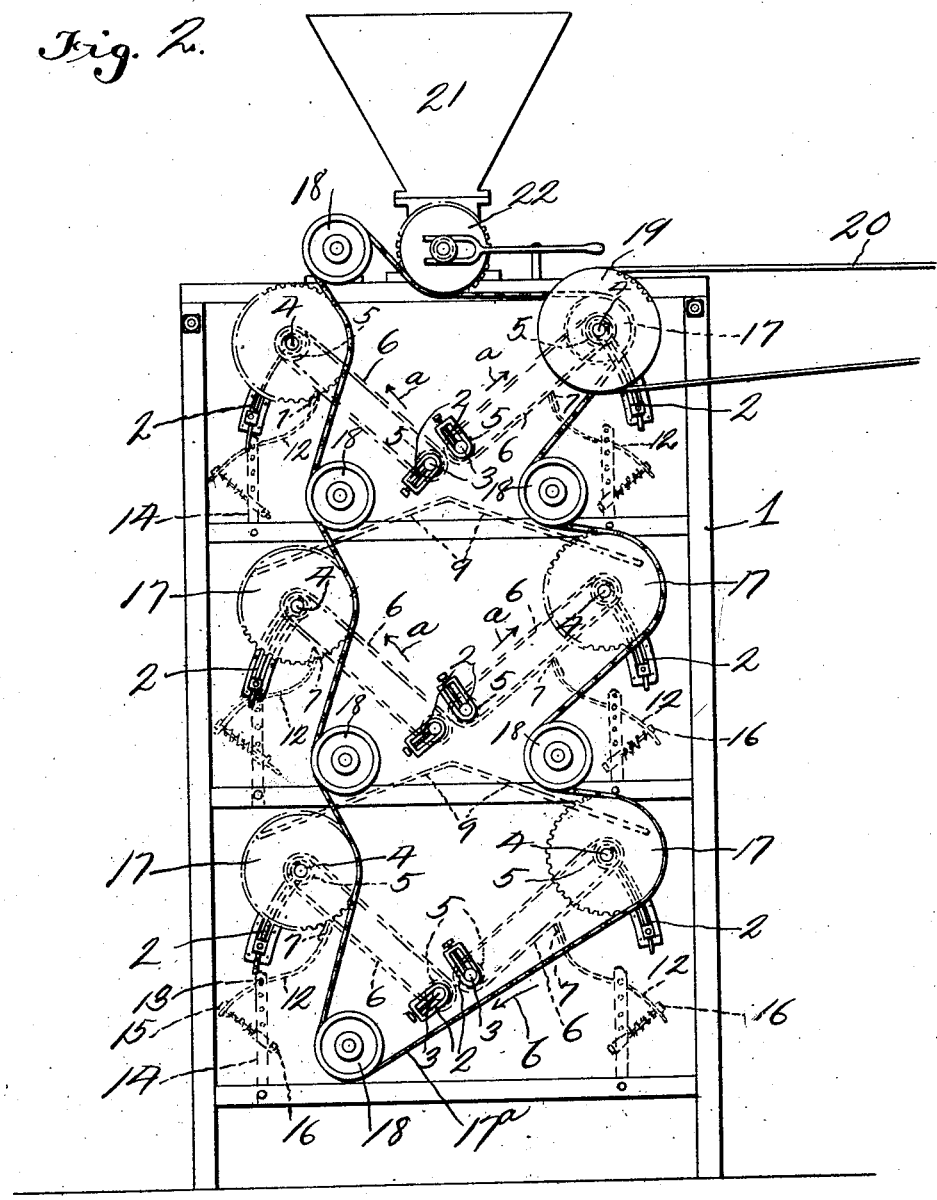
Figure 2 is an end view of the machine.
Figure 3:
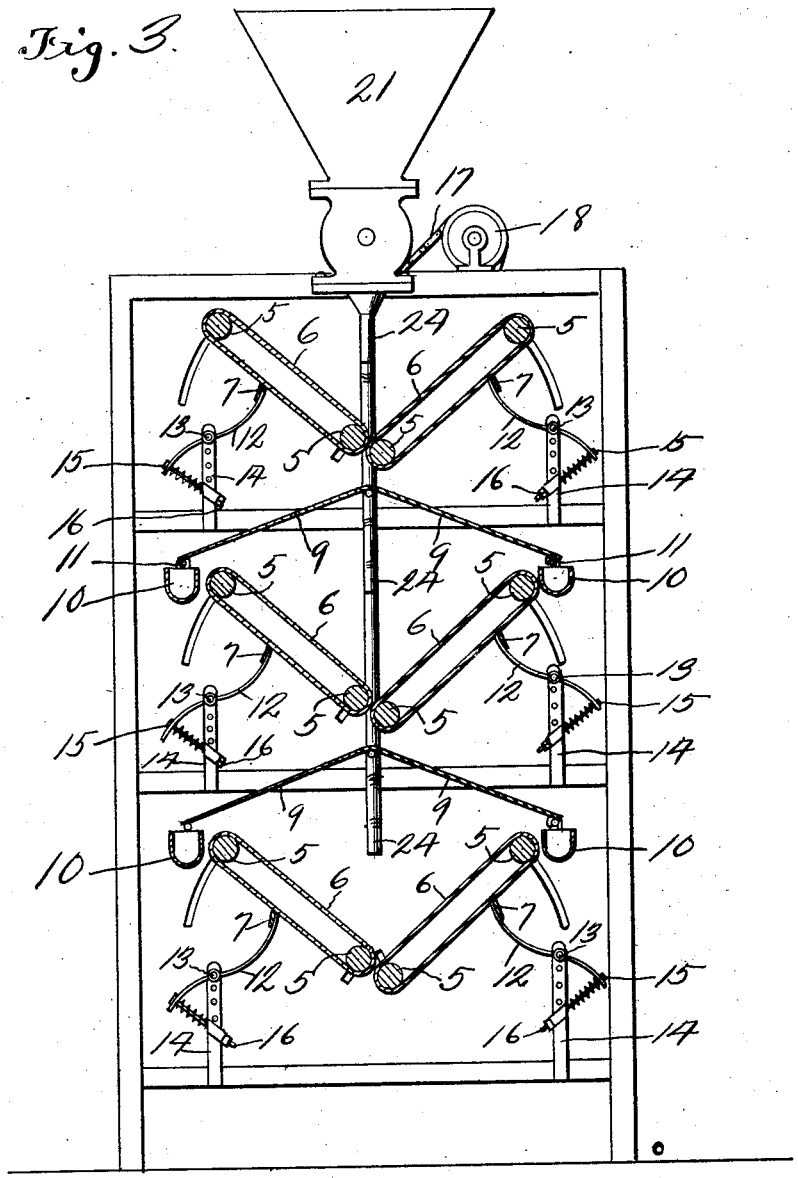
Figure 3 is a transverse sectional view through the machine.

Referring to the drawing, the numeral 1 designates the end members of the frame of the machine, in which are rotatably mounted in adjustable bearings 2 the pintles 3 and 4 of the conveyor rollers 5. Extending around the conveyor rollers 5 are canvas belts 6, which belts or conveyors incline downwardly and inwardly in V-shaped arrangement and in superimposed relation. Rollers 5 are inclined longitudinally of the machine, therefore it will be seen with the conveyor belts 6 moving in the direction of the arrow $a$, clover seed after being deposited on the high ends of the conveyors will be gradually worked towards the low end thereof. As the seed is bounced and moved longitudinally of the machine, the buckhorn or foreign matter mixed with the seed sticks to the conveyors which are formed of canvas and is conveyed upwardly over the upper rollers 5 of each pair of rollers, and thence downwardly where the yieldably mounted scraper bars 7, which engage the under sides of the conveyors will scrape the buckhorn and foreign matter from the conveyors. The material dislodged by the scrapers 8 drops downwardly onto the downwardly and outwardly inclined deflecting shields 9, down which it slides into longitudinally disposed troughs 10 at the opposite sides of the shield and supported on rods 11, which also support the opposite sides of the deflecting shields. The scraper bars 7 are carried by pivoted arms 12, which arms are pivotally connected at 13 to supporting arms 14 at opposite ends of the machine. Connected at 15 to the ends of the arms 12 are adjusting bolts 16 by means of which bolts the scraper bars 7 may be adjusted in relation to the under sides of the canvas conveyors 6 for varying the scraping pressure on the canvas conveyors for insuring dislodgment of the foreign matter carried thereby. During the cleaning operation the seed are not carried upwardly over the upper rollers 5, but only slightly upwardly on the conveyors and the move downwardly during the cleaning operation by gravity. However they are slowly worked longitudinally of the machine.

The pintles 4 of the upper rollers 5 have secured thereto sprockets 17 with which sprockets the endless sprocket chain 18 engages. Sprocket chain 17ª moves in the direction of the arrow b and over the idlers 18, and it will be seen that the upper sides of the conveyor belts 6 will move in the direction of the arrows a for conveying foreign matter upwardly and cleaning the seed. The pintle 4 of one of the upper sets of rollers 5 is provided with a drive pulley 19 over which pulley a belt 20 extends, and which belt may lead to any suitable source of power, therefore it will be seen that all of the conveyors 6 are driven from a single source of power. In operation seed is placed in the hopper 21 which may be of a conventional construction and may be provided with agitating means driven through the sprocket 22 which engages the sprocket chain 21. However a clutch 23 is provided which allows the stopping and starting of the hopper feed mechanism. Seed from the hopper is discharged onto the high ends of the conveyors 6 through the discharge pipes 24, which discharge pipes extend downwardly adjacent one end of the machine, therefore it will be seen that a continuous even supply of seed to be cleaned is discharged onto the conveyors during the operation of the machine, and the operator may through the medium of the clutch 23 stop the hopper feeding mechanism as desired for regulating the deposit of seed on the conveyors. Disposed adjacent one end of the machine and the low ends of the conveyor 6 is a main discharge pipe 25, which discharge pipe is provided with a plurality of branch discharge pipes 26 which extend inwardly and to a position below the lower ends or sides of the conveyors, and into which branch pipe the cleaned seed is discharged and conveyed to the main discharge pipe which may lead to any suitable source of storage.

From the above it will be seen that a seed cleaning machine is provided wherein a maximum amount of seed may be cleaned at the same time and as many tiers of conveyors may be used as desired for decreasing or diminishing the volume of seed cleaned by the machine. It will also be seen that the device may be used for cleaning various kinds of seed, however it is particularly adapted for cleaning clover seed. It will also be seen that all of the conveyors are driven from a single source of power as well as the hopper mechanism, thereby obviating the use of different sources of power.

The invention having been set forth what is claimed as new and useful is:—

1. A seed cleaning machine comprising a frame, a plurality of inwardly and downwardly inclined endless conveyors, said conveyors inclining longitudinally in relation to the frame, means for discharging seed onto the upper side portions of the conveyors, means for simultaneously operating said conveyors, downwardly and outwardly inclined deflecting plates between the conveyors, scrapers cooperating with the undersides of the conveyors above the deflecting plates and troughs suspended below the outer ends of the deflecting plates.

2. A seed cleaning machine comprising a plurality of pairs of superimposed downwardly and inwardly inclined belt conveyors, said conveyors being also transversely inclined, deflecting plates beneath the pairs of conveyors, yieldably mounted scraper bars cooperating with the under sides of the belt conveyors above the deflecting plates, means for simultaneously operating said conveyors from a single source of power and troughs beneath the outer ends of the deflecting plates.

3. A seed cleaning machine comprising a frame, V-shaped arranged belt conveyors, said conveyors extending over rollers, adjustable bearing members for the ends of said rollers whereby said belt conveyors may be longitudinally inclined, a hopper carried by the frame, pipes connected to the hopper and having their ends disposed above the pairs of conveyors adjacent the upper side portions thereof, discharge pipes disposed below the other side portions of the conveyors, deflecting plates beneath the pairs of conveyors, troughs beneath the outer edges of the deflecting plates, and means for operating said conveyors from a single source of power.

4. A seed cleaning machine comprising a frame, a plurality of superimposed V-shaped arranged endless belt conveyors, means for varying the inclination of the conveyors, deflecting members between the pairs of conveyors, scrapers cooperating with the under sides of the conveyors, means for depositing seed on the conveyors and means for simultaneously operating said conveyors.

In testimony whereof I have signed my name to this specification.

ALBERT BLEAM.